Sept. 1, 1925.                                                                1,552,055
C. F. HOLMES
REFRACTASCOPE
Filed July 8, 1924                          2 Sheets-Sheet 2
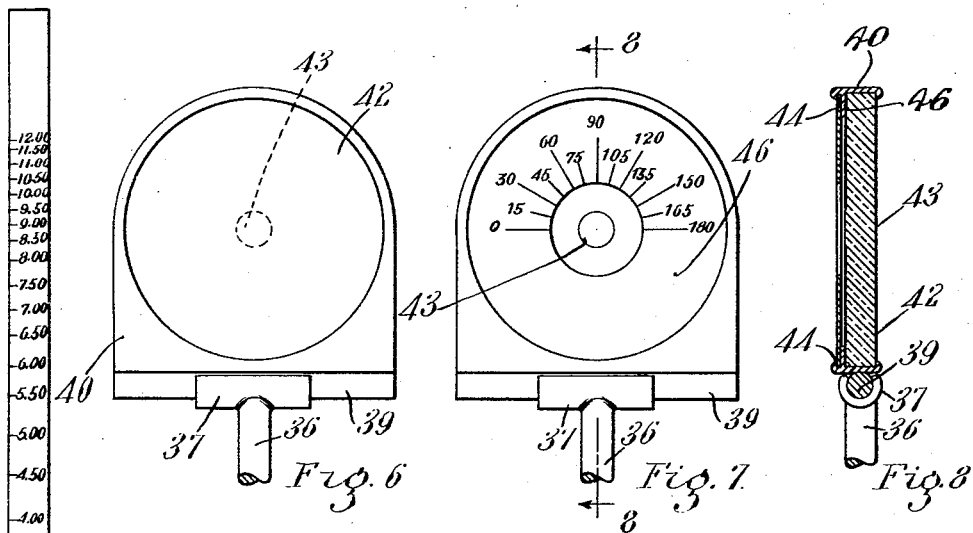
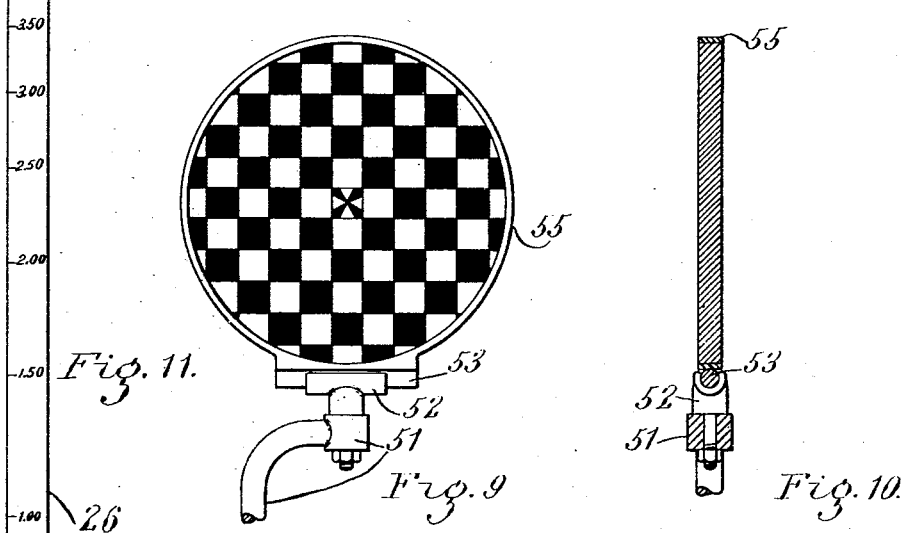
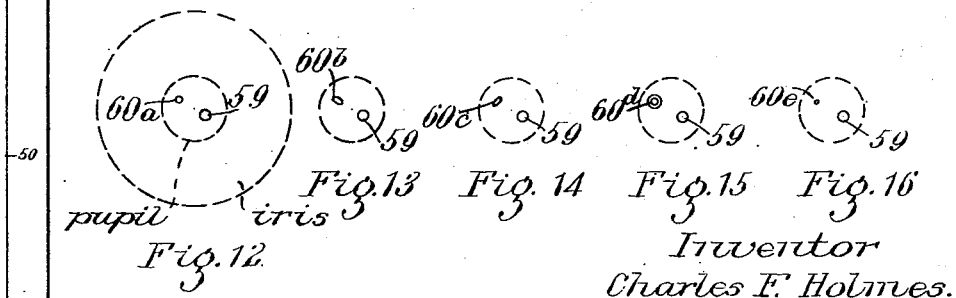
Inventor
Charles F. Holmes.
by Roberts, Roberts & Cushman
Att'ys.

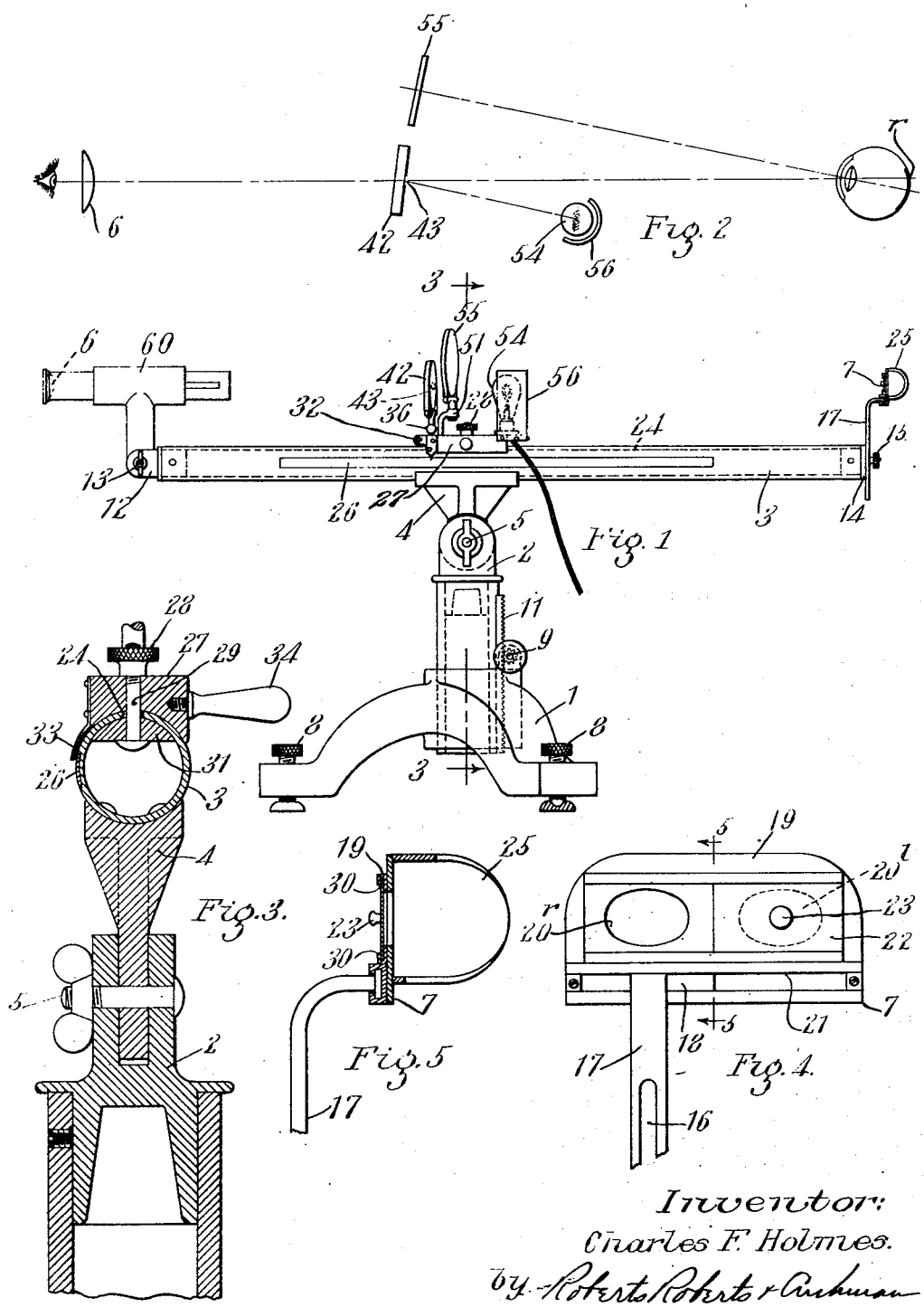

Patented Sept. 1, 1925.

1,552,055

UNITED STATES PATENT OFFICE.

CHARLES FRANCIS HOLMES, OF WEST SPRINGFIELD, MASSACHUSETTS.

REFRACTASCOPE.

Application filed July 8, 1924. Serial No. 724,778.

*To all whom it may concern:*

Be it known that I, CHARLES FRANCIS HOLMES, a citizen of the United States of America, and resident of West Springfield, in the county of Hampden and State of Massachusetts, have invented new and useful Improvements in Refractascopes, of which the following is a specification.

The present invention relates to a clinical optical instrument, primarily for use by the practicing oculist, optometrist or optician for the observation, determination and mensuration of the optical constants, normal or abnormal, such as the whole refractive effect at a predetermined fixation of the human eye. This instrument is hereinafter referred to as a refractascope.

It is not sufficient to rest a prescription for the correction of visual error or for treatment upon a diagnosis consisting only of the patient's own report of his sensory reaction to vision of test objects, such as the familiar printed placards of letters to be read at various distances. Such reports are helpful to a degree, but leave out of account the actual physical and physiological conditions which obtain in the organ itself, substituting for real observation and measurement of the eye a summation of its utmost capability of performance at the time of examination, and an interpretation through the sense perception of the patient, often vitiated by habit into an unfaithful report of the actual performance of the eye. If the eye is fatigued by over use or strain, or if nervous debility or any general physical impairment of the patient affecting vision should pertain, a test by the patient's observations is of doubtful value.

These conditions are of course of old prior knowledge, but the practicing oculist, optometrist or optician has not heretofore been provided with any instrument capable of substituting for the patient's observation the examiner's observation, except instruments like the well-known opthalmometer, which, however useful, are limited to observation of special facts or qualities only, such as the curvatures of the cornea and other reflecting ocular surfaces.

It is accordingly an object of this invention to provide an apparatus for observing the physical qualifications of the optical organs of the eye with accuracy, under conditions enabling a short and simple determination of the kind, degree and quality of refractive correction required to restore normal vision.

Other objects are to provide an instrument adapted to reduce observations for refractive error and for any particular or unusual physiological conditions which may exist at the time the examination is made to the utmost simplicity; to provide for an indication of the quantity and sign of the corrections directly read, and incapable of being mistaken or misconceived by a hurried or careless examiner. A further object is to provide accurate apparatus of simple construction capable of adjustment to suit the comfort and convenience of the patient and of the observer, and free from expensive elaborations.

The apparatus may comprise in general, an optical train for the observation of the image in space of an area of retinal illumination, with provision for coordinating the positions of the virtual source of light, of an object for fixation, and of observing means to enable reading the values of the exterior focal distance, and adapted for simultaneously observing the aberrations of the exterior image.

A preferred embodiment of the invention will be described with reference to the accompanying drawings in which:

Fig. 1 is a side elevation of the instrument as a whole;

Fig. 2 is a diagram in plan indicating the optical relationships involved, showing the observer's eye, the patient's eye, and the instrumental agencies;

Fig. 3 is a vertical section on line 3—3 of Fig. 1;

Fig. 4 is an enlarged left side elevation of a head rest shown in Fig. 1;

Fig. 5 is a section of the head rest on line 5—5 of Fig. 4;

Fig. 6 is an enlarged detail in front elevation of a mirror shown in Fig. 1;

Fig. 7 is a rear elevation of the matters shown in Fig. 6;

Fig. 8 is a section on line 8—8 of Fig. 7;

Fig. 9 is an enlarged detail in elevation of a target shown in Fig. 1;

Fig. 10 is a central vertical section of Fig. 9;

Fig. 11 is an enlarged detail elevation showing a scale shown in Fig. 1; and

Figs. 12 to 16 are diagrammatic representations of typical appearances to the observer respectively of a normal eye, an eye obliquely astigmatic, an eye obliquely astigmatic in an opposite sense, a hypermetropic and a myopic eye.

The recommended form of apparatus provides a positioning head rest adapted to align the eye to be observed with the instrumental elements; a fixation target, a reflector and a source of light; and an observing eye-piece; these so adapted and arranged as to permit the focal distance of the exterior image of an artificially illuminated spot on the retina to be ascertained at various distances of fixation, and to enable abnormality of this image to be observed directly.

Referring to Fig. 1, the apparatus may conveniently include a heavy tripod base 1, a vertical slide 2, in a bore in base 1, and a tubular guide 3 adjustably secured to the upright by the bifurcated web member 4, screws 5, and a wing nut, and carrying an observing eye-piece 6 at one end and a patient's head-rest 7 at the opposite end.

The base 1 may be provided with leveling screws 8 and a hand wheel and pinion 9 adapted to engage a rack 11 on the vertical slide 2 to alter the height of the optical elements to suit different patients or observers.

The eye-piece 6 may be mounted in a slide-tube in a sleeve 60 adjustable in altitude in the plane of guide 3, for example about a clamp-screw 13 in a bifurcated plug 12 fitting into the end of guide 3. The head rest 7 at the opposite end of the guide 3 may be supported on a similar plug 14, upon the end of which is adjustably mounted, for example, by a thumb screw 15 engaging a slot 16, an upright 17 having a cross head 18 upon which the head rest slides laterally. A front plate 19 of the head rest for example may have two openings $20^r$ and $20^l$ spaced apart at the average ocular distance, and provided with a lateral dovetail groove 21 to receive the cross head 18 with limited freedom of motion, so that the center of the opening $20^r$ or $20^l$ may be brought into the plane of the axis of the eye piece 6. The patient's side of the head rest 7 may have any form of hood 25 for laterally and horizontally positioning the patient's head. On the observer's or left side of plate 19, Fig. 1, a shutter 22 having a handle 23 to cover one of the openings $20^r$ or $20^l$ is adapted to slide in ways 30.

The support 17 for head rest 7 may be vertically or horizontally adjusted at screw 15 and slot 16, and provides an opening for either the right or the left eye in the central longitudinal plane, the other eye opening being closed by the shutter 22.

Referring to Fig. 3, guide 3 may be a length of tubing having an upper longitudinal slot 24 and a dove-tail groove on one side holding a fixed scale 26 suitably graduated, see Fig. 11, as presently referred to. Fitting the upper surface of the guide 3 a carrier block 27 having an index 33 and a handle 34 may have a locking bolt 29 in slot 24 and in a bore in a locking segment 31, and adapted to be clamped to the guide 3 by a thumb nut 28. Carrier block 34 has longitudinal freedom of motion in slot 24 for a suitable distance, in practice not necessarily more than two or three feet, and may be provided with a longitudinal slot, not shown, and a pinch screw 32 across said slot.

Carrier block 27 is vertically bored to receive mountings for a target 55, a reflector 42 and an incandescent lamp holder 56. These mountings may be round rods. The mounting for the reflector at 36 may have a tubular cross piece 37 (Fig. 6) cut away at its upper portion to receive and frictionally hold a cylindrical cross piece 39 fixed upon the bottom of a cell 40 for the reflector 42, which may thus be adjusted laterally by sliding, angularly in a vertical sense by rotation in the tubular piece 37, and in azimuth and vertically by rotating and sliding with rod 36 in its bore, which is entered by the slot closed by pinch screw 32. The reflector 42 is preferably a round piece of plane parallel glass silvered on the surface toward head rest 7, the silver coat being removed at a central portion 43 which in use is aligned with the eye piece 6 and with the locus of that opening $20^r$ or $20^l$ in the head piece which is uncovered and on the central vertical plane of the apparatus. On the left side of the cell 40, Fig. 8, a seat 44 is provided to receive an annular graduated scale 46 having its central opening in registry with the unmirrored portion 43 of the reflector 42. Scale 46 is graduated to read vertical angles central on the optical axis of observation, for making comparative estimates of astigmatic error.

Target 55, Figs. 1 and 9, is preferably positioned at the same radial distance from the eye to be observed as the reflector 42 to one side of the central plane and preferably in a higher plane than the reflector 42. The target 55 may be any suitable object having a place on which attentive vision may be fixed. Preferably this target is mounted in a frame having a cylindrical lug 53 in a segmental sleeve 52 carried by an offset rod 51 in a bore in carrier block 27, and thus having universal adjustment. Carrier block 27 carries a source of illumination, such as an electric lamp 54 in a socket on the lateral bracket and shield 56, which on the side toward the patient provides an opaque shield. Lamp 54 should have a well-concentrated filament, and this is arranged at substantially the height of the opening 43 in the reflector, and on the opposite side of the central vertical plane of the apparatus from the target 55. Light from lamp 54 is to be reflected from the silvered surface 42 into the patient's eye along the central vertical plane at 20. For this purpose the mirror is adjusted in azimuth at an angle to the axis of the apparatus, as shown in Figs. 1 and 2, to reflect light from lamp 54 along the central plane of the apparatus and into the patient's eye, as indicated in Fig. 2.

In use the patient is instructed attentively to observe the fixation place at the center of target 55, and the carrier block 27 is then moved by the operator to a position reported by the patient to enable him to see the target clearly and without strain. The reflected light from mirror 42 will now be focussed on the retina at $r$ (see Fig. 2) if the patient really is capable of causing the eye lens to form a well-focussed image, but not otherwise. This illuminated spot or internal image on the retina (which, as well-known, has considerable powers of reflection) will form an exterior bright image in space normally at the distance of the target, and which in this case will be at or near the plane of the reflector 42. This image is focussed and examined by the observer with the aid of the eye-piece 6, which may be a plano-convex lens of about 3.25 diopters, employed only for slight magnification of the observed image and to reduce the necessary distance between the observer's eye and the instruments on the carrier block 27.

The normal appearance to the observer is diagrammed in Fig. 12 in which 59 is the bright reflection from the corneal surface of the source of light as reflected in reflector 42, which reflection by the dispositions mentioned, is out of line with the optical axis of the eye or the observing apparatus. At $60^a$, above and to the left of 59, is the image of the illuminated spot on the retina. If this spot is well-defined and round the operator may proceed to determine the point at which ciliary accommodation ceases, or begins to cause optical peculiarities of the eye-lens, or is without effect on the optical adjustment of the patient's eye-lens, by moving the carrier block 27 and its instruments toward and away from the observer. Coincidence of distance of the target and a well-focussed exterior image from the eye under examination obviously can occur only when the curvature of the eye-lens is such as sharply to focus on the retina the object represented by the illuminated aperture of the reflector 42. The distance from the eye when there is such coincidence is clearly a measure of the exterior conjugate focal distance for normal attentive vision for the eye observed. Readings of the position of the carrier block 27 and pointer 33 in respect to the scale 26, when there is coincidence of a good image with the surface of reflector 42, thus at once establishes the power of the eye to accommodate by varied curvature of the lens for variable distance, and the fact and extent of abnormalities. The scale 26 may bear any kind of indication, but for convenience, as shown, is preferably graduated to read directly in terms of the required powers of a correcting lens in diopters. See Fig. 11.

The character of the focussed exterior image, as well as its position, indicates the facts about the eye-lens. A hypermetropic eye (in which the exterior conjugate focal distance is at infinity, or at least beyond the convenient dimensions of this instrument) is in general incapable of forming a sharp retinal image at any of the possible distances of the object 55 and reflector 43, and the observed image is aberrated into an ill-defined enlarged circle $60^d$, Fig. 15, if the eye is otherwise normal. If the eye is myopic, coincidence is not only too near the eye, but the magnification of the exterior image of the confused retinal image is correspondingly low (the exterior focal distance being short) and best definition to the observer occurs when the exterior image is far too small, as indicated at $60^e$ in Fig. 16. If the eye has any important degree of astigmatic distortion, the exterior image will not be round, but will be a band, such as $60^b$, Fig. 13, or $60^c$, Fig. 14, the direction of the distortion varying with the astigmatic axis. This is an indication incapable of being mistaken of the direction of the astigmatic correction required, and the angular magnitude and direction of this may be read by comparison with the inclination scale 46, without possibility of important errors. The length of the bands $60^b$ or $60^c$ is, to the experienced observer, a sufficient measure of the amount of cylindric refractive correction required, easily checked by only one or two trials of correctors.

The instrument may be used with test lenses before the patient's eye, and as so used will indicate to the observer the combined effect of the natural and artificial lenses to produce a corrected image.

I claim:

1. A clinical optical instrument having a source of illumination and a fixation object arranged for the comparison of the distance of the exterior image of an illuminated image on the retina with the fixation distance.

2. A clinical optical instrument having a source of illumination and a fixation object arranged for the comparison of the distance of the exterior image of an illuminated image on the retina with the fixation distance, in combination with means for measuring the exterior conjugate focal distance of the eye lens at fixation.

3. In a clinical optical instrument for ocular mensuration, the combination of a guide, a sliding carrier adapted to move on the guide, and a reflector having a transparent region and a target for fixation carried by the sliding carrier.

4. In a clinical optical instrument for ocular mensuration, the combination of a guide, a head rest adapted to position a patient's eye in the plane of said guide, a sliding carrier adapted to move on the guide, and a reflector having a transparent region and a target for fixation carried by the sliding carrier.

5. In a clinical optical instrument for ocular mensuration, the combination of a guide, a head rest adapted to position a patient's eye in the plane of said guide, a sliding carrier adapted to move on the guide, and a reflector having a transparent region and a target for fixation carried by the sliding carrier, and a scale for measuring the position of the sliding carrier.

6. In a clinical optical instrument, the combination of a head rest adapted to position the eye to be examined, a guide supporting the head rest, and an observing eye-piece, with a carrier arranged for motion in the plane defined by the eye and eye-piece, said carrier having thereon a reflector adapted to illuminate the retina and provide a transparent space through which an exterior image formed by the eye lens may be observed.

7. In a clinical optical instrument, the combination of a head rest adapted to position the eye to be examined, a guide supporting the head rest, and an observing eye-piece, with a carrier arranged for motion in the plane defined by the eye and eye-piece, said carrier having thereon means adapted to induce axial positioning of the eye and fixation of attention on a point at one side of the vertical plane of the apparatus, and a reflector adapted to illuminate the retina and provide a transparent space through which an exterior image formed by the eye lens may be observed.

8. In a clinical optical instrument, the combination with a carrier slide of an apertured reflector, a target and a source of light adapted to be moved together in the direction of the light reflected by the reflector.

9. In a clinical optical instrument, the combination with a carrier slide of an apertured reflector, a target and a source of light adapted to be moved together in the direction of the light reflected by the reflector, and a guide for directing said motion in a straight line.

10. In a clinical optical instrument, the combination with a carrier slide of an apertured reflector, a target and a source of light adapted to be moved together in the direction of the light reflected by the reflector, and a guide for directing said motion in a straight line comprising a slotted tubular member.

11. In a clinical optical instrument, a reflector having a transparent central area, in combination with an inclination scale central upon an axis normal to said area and adapted to be read from a point at the rear of the reflector.

12. In a clinical optical instrument, the combination with a slide defining a plane of motion for a source of reflected illumination of a head rest adapted to slide laterally to bring either eye of a patient into said plane.

13. In a clinical optical instrument, the combination with a slide defining a plane of motion for a source of reflected illumination, of a head rest adapted to slide laterally to bring either eye of a patient into said plane, and a shutter movable relative to said head rest and operative in either position of the latter to cover the other eye of the patient.

Signed by me at Springfield, Massachusetts, this first day of July, 1924.

CHARLES FRANCIS HOLMES.